Jan. 10, 1967 E. J. NOSSEN 3,298,019

ANALOG TO DIGITAL CONVERTER

Filed April 3, 1964 2 Sheets-Sheet 1

INVENTOR.
EDWARD J. NOSSEN

BY John V. Regan

Attorney

INVENTOR.
EDWARD J. NOSSEN
BY John V. Regan
Attorney

United States Patent Office 3,298,019
Patented Jan. 10, 1967

3,298,019

ANALOG TO DIGITAL CONVERTER

Edward J. Nossen, Haddonfield, N.J., assignor to Radio Corporation of America, a corporation of Delaware Filed Apr. 3, 1964, Ser. No. 357,180
10 Claims. (Cl. 340—347)

This invention relates to converters, and in particular, to analogue-to-digital converters, especially those which provide a binary coded decimal output.

Many techniques are known in the art for analogue-to-digital conversion. A generalized scheme of conversion makes use of a digital number register having its output supplied to a digital-to-analogue converter which may be, for example, a weighted resistor network. The output of the converter is used as a reference signal against which an unknown analogue input signal is compared, and the difference between these two signals controls logic for changing the number stored in the register for a better approximation. After a sufficient number of trials, the converter output either equals the unknown signal or is the closest available approximation thereto, and the number then stored in the register is the digital representation of the analogue input signal.

According to one known technique, all of the register stages are connected as an up-counter. A series of clock pulses is applied to the counter, and the counter counts in the sequence 1, 2, 3, etc. until an overflow occurs, that is to say, until the converter output is greater in magnitude than the unknown signal. This is one of the simplest techniques but, in an analogue-to-binary coded decimal conversion, it requires an initial reset of the counter to zero plus a maximum of nine count pulses per decade. On a statistical basis, the average time required per decade is five clock pulses since some numbers will be smaller than others. Techniques are available for reducing the conversion time but they generally require a large amount of additional circuitry. It is one object of this invention to provide an improved analogue-to-digital converter.

It is another object of this invention to provide an analogue-to-digital converter which has a shorter conversion time than the system aforementioned, but which does not require much additional circuitry.

It is a further object of this invention to provide an improved analogue-to-binary coded decimal converter which has a speed advantage over some of the faster prior art converters, but which requires fewer components.

According to the invention, all of the stages of a digital number register except the stage of lowest order (least) significance are connected for operation as an up-counter. The stage of least significance is initially set to store a binary 1 and all of the counter stages are reset to binary 0. The counter is triggered to count by twos when the unknown signal is greater than the converted output of the number register. Upon an overflow, the counter is stopped and the stage of lowest order significance in the register is reset to binary 0. If the overflow continues, operation on the number register is complete, but if the overflow disappears the stage of lowest order significance is again set to a binary 1.

An additional input, in the form of a bias, may be applied to the digital-to-analogue converter to cause the output thereof to be slightly greater than the analogue equivalent of the number stored in the register. For example, the output may be the analogue of a number which is one higher than the number in the register.

Moreover, if desired, in a multidecade analogue-to-binary coded decimal converter, the bias may be provided by initially setting to a count of nine each of the decades which are of lower order significance than the decade which is being triggered.

In the accompanying drawing, like reference characters denote like components, and:

Figure 1:
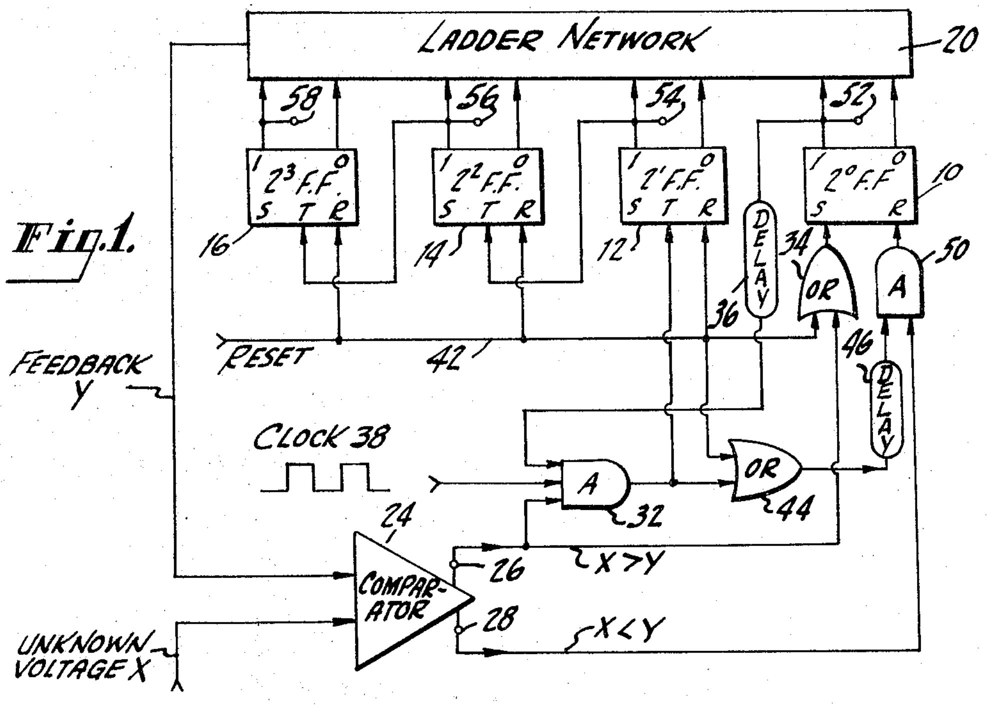
FIGURE 1 is a logic diagram, partly in block form, of one embodiment of the invention.

The FIGURE 1 arrangement includes a digital number register having four bistable storage devices 10 . . . 16 which may be, for example, flip-flops. Each flip-flop stores a binary digit, 1 or 0, of different order significance. A flip-flop stores a binary 1 when it is in the set state, and stores a 0 when it is in the reset state. The flip-flop 10 of lowest order significance has set (S) and reset (R) input terminals and corresponding (1) and (0) output terminals. All of the other flip-flops 12 . . . 16 are triggerable flip-flops having trigger (T) input terminals in addition to the set and reset input terminals. A triggerable flip-flop is a flip-flop which is triggered from its present stable state to the other stable state in response to a signal of proper amplitude and polarity applied at its trigger input terminal. The triggerable flip-flops 12 . . . 16 are connected as an up-counter, or forward counter, by coupling the (1) output terminal of each flip-flop thereof to the trigger input terminal of the flip-flop of the next higher order significance.

Each of the flip-flops 10 . . . 16 is shown as having both of its outputs applied to an analogue-to-digital converter 20 which may be, for example, a weighted resistor or ladder network. Depending upon the particular network employed, either both outputs or only one output of each flip-flop may be supplied to the network 20. It is the function of the ladder network to provide an output voltage Y whose magnitude bears a specified relation to the number stored in the digital number register. For reasons which will be clear as the discussion proceeds, the ladder network preferably is arranged so that the output Y is the analogue of a number which is slightly greater than the number stored in the register, for example, by an amount not exceeding the lowest "unit" of the stored number. Output Y and an unknown analogue input voltage X are supplied as inputs to a comparator 24, which may be, for example, a differential amplifier having first and second output terminals 26, 28. A first signal is present at the output terminal 26 when the unknown analogue input signal X has a greater magnitude than the output voltage Y of the ladder network 20. A second signal is present at output terminal 28 when the output Y of the ladder network 20 has a greater magnitude than the unknown analogue voltage X.

Output terminal 26 of the comparator 24 is connected to one input of an AND, or coincidence, gate 32 and to one input of an OR gate 34. OR gate 34 has its output connected at the set input terminal of the flip-flop 10 of lowest order significance. The (1) output of this flip-flop is delayed in a device 36 and applied as a second input to the AND gate 32. This second input is "primed" when the flip-flop 10 is in the set state. Clock pulses 38 are applied at a third input of the AND gate 32. An AND gate, for present purposes, may be defined as a gate having two or more input terminals and one output terminal, characterized in that the voltage at the output terminal has a specified one of two values only when all of the inputs have the specified value.

The (R) input terminals of the counter flip-flops 12 . . . 16 are connected to a common reset line 42. Reset line 42 also is connected to a second input of OR gate 34 and to one input of another OR gate 44. The output of AND gate 32 is applied at the trigger (T) input terminal of the flip-flop 12 of lowest order significance in the counter, and is also applied as a second input to OR gate 44. OR gate 44 has its output delayed in a device 46 and applied as one input to an AND gate 50. A second input to this gate 50 is connected to the second output terminal 28 of the comparator, and the output of the AND gate 50 is applied at the reset input terminal of the flip-flop 10.

Consider now the operation of the FIGURE 1 arrangement. Assume that the unknown voltage X has a magnitude that is greater than seven units and less than eight units. Assume also that the ladder network has an applied bias, or additional input, as aforementioned, of such value that the magnitude of its output Y, measured in the same voltage units, is the analogue of a number that is one more than the number stored in the digit number register. Operation commences by applying a reset pulse to the common reset line 42. This pulse resets the flip-flops 12 . . . 14 in the counter directly, and sets the flip-flop 10 by way of OR gate 34, whereby the register initially stores the number 0001. The output of the ladder network then is two units in magnitude.

A signal is present at output terminal 26 of the comparator 24 because the unknown voltage X has a greater magnitude than the output voltage Y of the ladder network 20. This signal primes one input of the control AND gate 32; the (1) output of the flip-flop 10 primes a second input because the flip-flop is in the set state. AND gate 32 becomes fully enabled by the next occurring clock pulse 38 and triggers the counter flip-flop 12. The binary number then stored in the register is 0011, equivalent to three units in the given system, and the output Y of the ladder network rises to four units in magnitude. This voltage Y is still less than the analogue input voltage Y, whereby the comparator 24 continues to supply a signal at its output terminal 26.

AND gate 32 is enabled again by the next clock pulse 38 and triggers the counter flip-flop 12 from the set to the reset state. The resulting change in voltage at the (1) output terminal thereof triggers the next flip-flop 14 to the set state. The register now stores the binary number 0101, and the output Y of the ladder network 20 rises to six units in magnitude. It should be noted that each output from control AND gate 32 increases the number stored in the register by a count of two.

The next occurring clock pulse 38 again fully enables gate 32 to trigger the counter flip-flop 12 to the set state. Additionally, the output of AND gate 32 is passed by OR gate 44 to delay device 46. The binary number 0111, equivalent to seven units, now is stored in the register, and the ladder network has an output of eight units. Since this voltage is greater in magnitude than the unknown input voltage X, the first signal at terminal 26 of the comparator 24 terminates and the second signal appears at terminal 28. Control AND gate 32 becomes disabled when the first signal terminates. The second signal, at terminal 28, primes one input of AND gate 50, and the gate becomes fully enabled when it receives the delayed output of control AND gate 32 at its other input.

Were it not for delay device 46, the signal applied at that other input of AND gate 50 would terminate with the last clock pulse passed by gate 32. Due to inherent delays in the counter, ladder network 20 and comparator 24, it is possible that the signal might not have appeared at the comparator output terminal 28 before the clock pulse terminated. In that event, AND gate 50 could not become enabled. The delay device 46 is provided to assure that the last output of gate 32 is not applied to AND gate 50 until the signal appears at comparator output terminal 28, or at least assures that both inputs to gate 50 are applied concurrently.

Flip-flop 10 then becomes reset, the register stores the binary number 0110, equivalent to six units, and the output of the ladder network 20 decreases to a magnitude of seven units. This voltage is less than the unknown voltage X, whereby the signal at comparator output terminal 28 terminates and the first output signal reappears at terminal 26. Although this latter signal primes one input of control AND gate 32, the gate cannot pass clock pulses because its remaining input is unprimed when flip-flop 10 is in the reset state. However, the signal at output terminal 26 is passed by OR gate 34 and again sets the flip-flop 10. Gate 32 still cannot be enabled by clock pulses at this time because the (1) output of flip-flop 10 is delayed in device 36 before being applied to the gate 32.

Binary number 0111 now is stored in the register and the network output voltage Y has a magnitude of eight units. Since this voltage exceeds the unknown voltage X, the first signal terminates at comparator output terminal 26 and the second signal reappears at terminal 28. Delay device 36 is chosen to delay the change in voltage at the (1) output terminal of flip-flop 10 from reaching gate 32 until the signals change at terminals 26 and 28 of the comparator 24. This assures that no clock pulses are passed by gate 32 during the transient period. Since no clock pulses are passed by gate 32, the AND gate 50 does not become enabled, and flip-flop 10 cannot become reset.

The system now is immune to further clock pulses, and the final number stored in the register is 0111, equivalent to an analogue voltage of seven units. The number stored in the register may be read out at terminals 52 . . . 58. Recalling that the unknown voltage had a value between seven and eight units, it will be recognized that the stored number is less than the unknown voltage, but the difference is less than one unit. This is the case generally in analogue-to-digital converters. A closer approximation may be attained if the additional input or bias to the ladder network 20 causes the output voltage thereof to be only one-half unit higher than the analogue of the stored number. In that event, the final number stored in the register would be 0111 if the unknown voltage X had a value within the range of 6.5 to 7.5 units and would be 1000 if the unknown had a value within the range 7.5 to 8.5 units, for example. The maximum difference between the stored number and the unknown then is the equivalent of one-half unit.

When the digital number register is used for analogue-to-binary coded decimal conversion, the maximum number of operations is a reset to 0001, plus four counts (3, 5, 7, 9) and one trial on overflow. On a statistical basis, the average conversion takes only three operations, which is a considerable saving in time as compared with the prior art scheme wherein the register stages are triggered 1, 2, 3, 4, etc. Moreover, the additional logic required to effect this saving in time is relatively simple, as can be seen in FIGURE 1.

Figure 2:
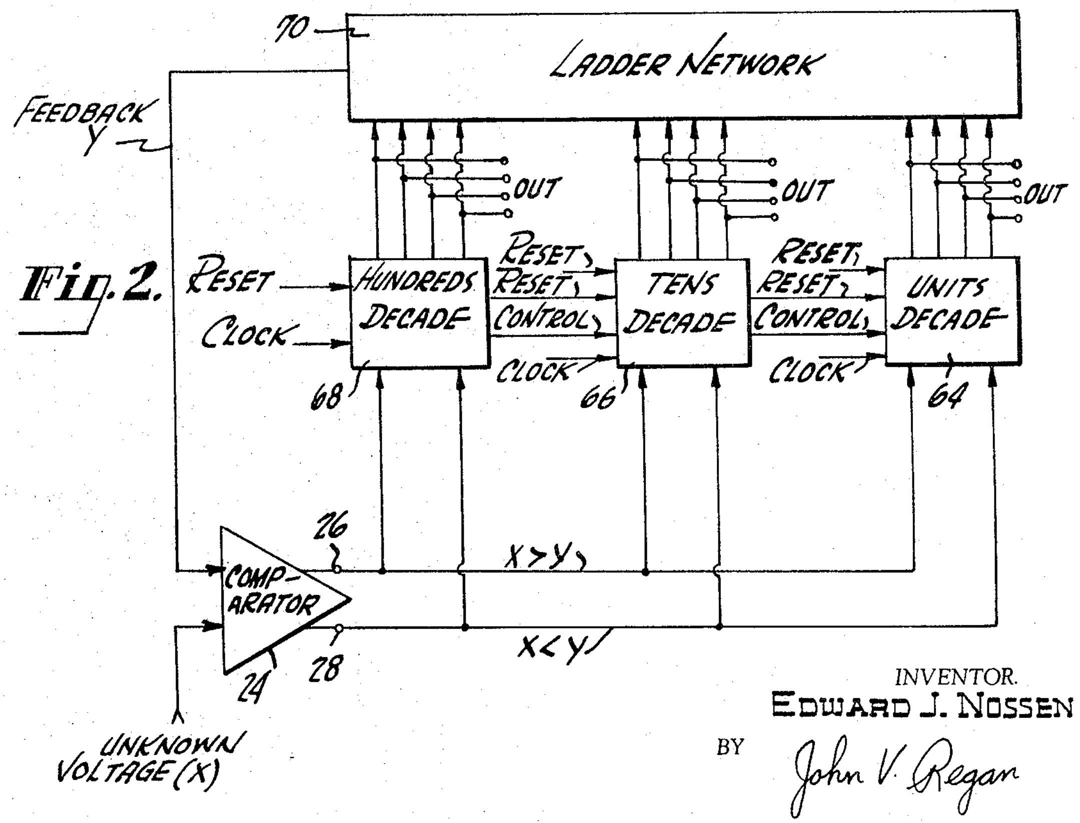
FIGURE 2 is a block diagram of a multidecade analogue-to-binary coded decimal converter.

A multidecade analogue-to-binary coded decimal converter is illustrated in block form in FIGURE 2. The arrangement is illustrated, by way of example, as having three decades, namely a units decade 64, a tens decade 66 and a hundreds decade 68. Each of the decades receives the two outputs from a common comparator 24, which may be, for example, a differential amplifier of the type previously described in connection with FIGURE 1. Each decade has its outputs applied to a common ladder network 70, or other digital-to-analogue converter, the output voltage Y of which is applied as one input to the comparator 24. An unknown voltage X is applied as the other input to the comparator.

A reset pulse from a common reset source (not shown) and clock pulses are applied to each of the decades 64 . . . 68. In addition, the hundreds decade 68 supplies a reset signal and a control signal to the tens decade 66, and the tens decade supplies a reset signal and a control signal to the units decade 64. It is desirable that the output Y of the ladder network 70 be the analogue of a number that is slightly higher than the number which has been entered into the decades by the triggering thereof. This result is accomplished conveniently by initially resetting the units and tens decades 64 and 66 to a count of nine (1001) and resetting the hundreds decade 68 to a count of one (0001). In that way, when the hundreds decade 68 is being triggered, the output Y is the analogue of a number that is ninety-nine higher than the number stored in the hundreds decade. Stated in another way, the output Y is the analogue of a number that is just slightly less than one unit higher than the lowest digit of the hundreds multiplier. When the tens decade 66 is being triggered, the output Y is the analogue of a number that is nine higher than the number then stored in the hundreds and tens decades. In the event it is desired that the final binary coded decimal number be less than the digital equivalent of the input X, in the case where X is not an integral number of units, an additional input or bias may be supplied to the ladder network 70, as in the case of FIGURE 1, to increment the output thereof by one unit. As the operation of any decade is completed, the decade of next lower order is reset to 0001. These features will be clearer as the description proceeds.

Figure 3:
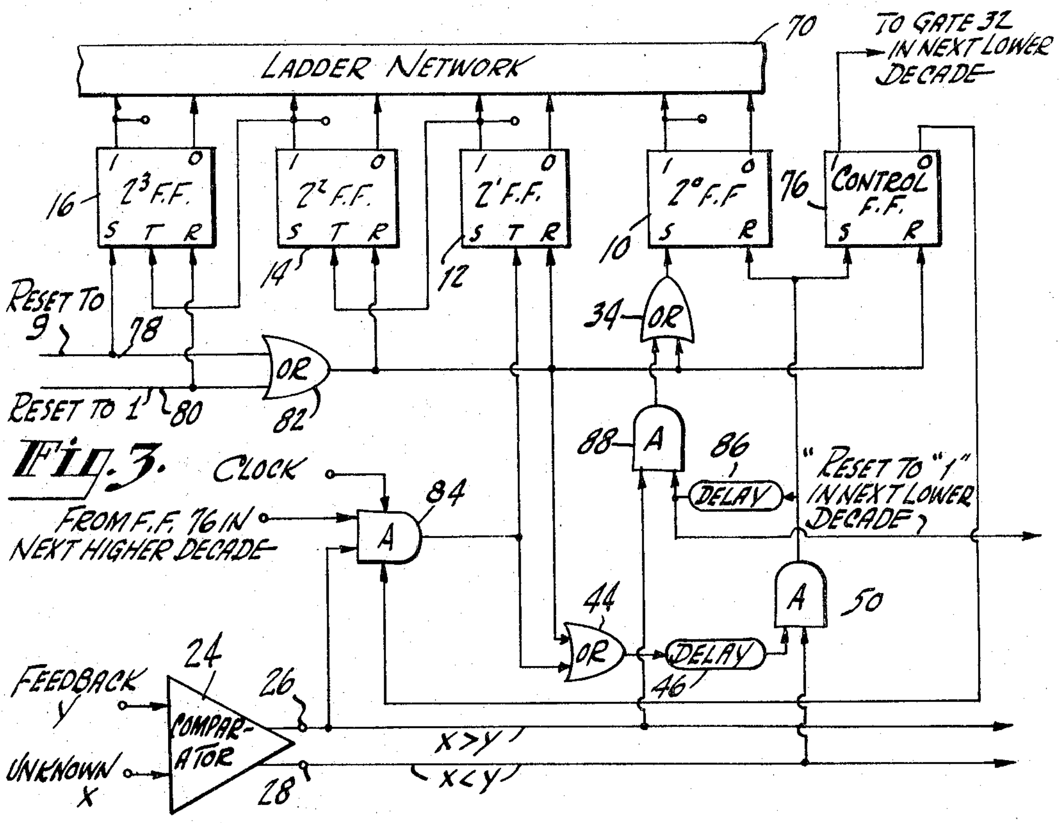
FIGURE 3 is a logic diagram, partly in block form, of another embodiment of the invention.

FIGURE 3 is a logic diagram of an embodiment of the invention suitable for use as a decade in the system of FIGURE 2. This embodiment is similar generally to the embodiment of FIGURE 1; therefore, only the differences between the two will be described in detail. The decade includes a digital number register having four flip-flops 10 . . . 16. In addition, the decade includes a fifth flip-flop 76 provided for control purposes. Two reset input lines 78, 80 are provided, and both are connected as inputs to an OR gate 82. The first reset line 78, labeled "reset to 9," is connected to the set (S) input terminal of flip-flop 16; the other line 80, labeled "reset to 1," is connected to the reset (R) input terminal of the flip-flop 16. The output of OR gate 82 is applied directly to the reset terminals of flip-flops 12 and 14, to the reset input terminal of the control flip-flop 76, and is applied by way of OR gate 34 to the set input terminal of the flip-flop 10 of lowest order significance in the register.

Control flip-flop 76 has its (0) output terminal connected to one input of the control AND gate 84. A second input to the gate 84, in all decades, except the decade of highest order significance, is connected to the (1) output terminal of the control flip-flop 76 in the decade of next higher order significance. For example, the control AND gate 84 in the tens decade has one input connected to the (1) output of the control flip-flop 76 in the hundreds decade. The other inputs to the gate 84 are the same as those in the FIGURE 1 embodiment.

Output terminal 28 of the comparator 24 is connected, as in FIGURE 1, to one input of an AND gate 50. The output of this AND gate is applied to the reset terminal of flip-flop 10 and to the set terminal of the control flip-flop 76. Additionally, this output is delayed in a device 86 and then applied as one input to an AND gate 88. The delayed output also is applied to the reset to 9 line 78 in the decade of next lower significance. A second input of AND gate 88 is connected to the output terminal 26 of the comparator 24 and AND gate 88 has its output applied by way of OR gate 34 to the set terminal of the flip-flop 10 of lowest order significance in the decade.

Before describing the operation of a multidecade system employing such decades, consideration will first be given to the operation of a single decade. The decade becomes operative when the control flip-flop 76 in the stage of next higher order becomes set to prime one input of the control AND gate 84. Shortly thereafter, as determined by the delay 86 in the next higher order decade, a signal is applied to the reset to 1 line 80. The digital number register 10 . . . 16 then stores the number 0001. If the output of the ladder network 70 is less than the unknown input X, a signal appears at the output terminal 26 of the comparator, and control AND gate 84 becomes enabled each time a clock pulse is applied thereto.

Each output of the AND gate 84 triggers the flip-flop 12 in the counter to increase by two the number stored in the digital number register. In addition, the output of gate 84 is delayed in device 46 and then applied to one input of AND gate 50. When an overflow occurs, the enabling signal is removed from the output terminal 26 and a second signal appears at output terminal 28. This signal enables AND gate 50 when the delayed output of gate 84 is concurrently applied, and the output of AND gate 50 resets the flip-flop 10 and sets the control flip-flop 76. Control flip-flop 76 then primes one input of the AND gate 84 in the decade of next lower order. After a delay, as determined by device 86, the output of AND gate 50 primes one input of AND gate 88 and also is applied to the reset to 1 line 80 in the decade of next lower order.

If the output of ladder network 70 is still greater than the unknown voltage X after flip-flop 10 is reset, the operation is completed in the decade. On the other hand, if the output Y is now less than X, a signal reappears at output terminal 26 of the comparator 24 and enables AND gate 88, whereby the flip-flop 10 of the lowest order significance in the decade is again switched to the set state. The output at terminal 26 also primes one input of the control AND gate 84, but this gate is disabled at this time because the control flip-flop 76 is in the set state. Flip-flop 10 cannot thereafter be reset again because control AND gate 84 does not pass clock pulses through OR gate 44 and delay device 46 to the AND gate 50.

Figure 4:
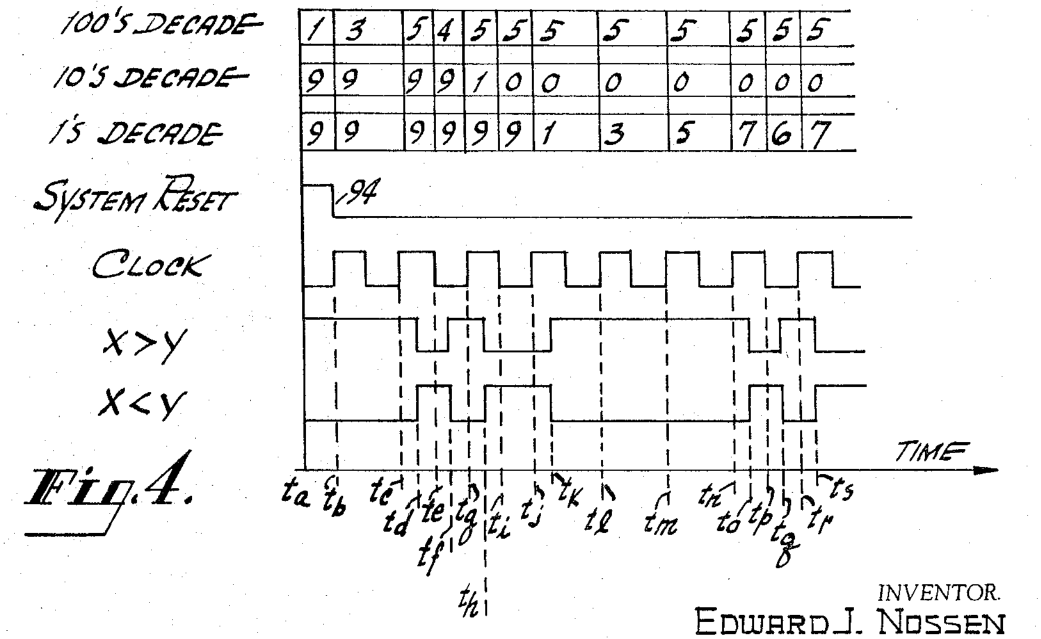
FIGURE 4 is a timing diagram useful in explaining the operation of the FIGURE 3 arrangement.

Operation of the FIGURE 2 system, when employing decades of the type illustrated in FIGURE 3, can best be described by way of an example. Let it be assumed that the unknown analogue input X has a value which is greater than 506 units and less than 507 units. The initial reset pulse 94 from the common source (not shown) is applied at the reset to 1 line 80 of the hundreds decade 68 and is applied at the reset to 9 line 78 of the tens and units decades 66 and 64 at a time $t_a$ (FIGURE 4). The hundreds decade 68 stores the binary number 0001, and each of the tens and units decades store the binary number 1001, whereby the output Y of the ladder network 70 is a voltage having a magnitude of 199 units.

Control flip-flop 76 in the hundreds decade 68 is reset by the initial reset pulse 94, and its output primes one input of the control AND gate 84 in that decade (FIGURE 3). Since the output voltage Y of the ladder network is less than the unknown voltage X, a signal is present at the output terminal 26 of the comparator 24, and primes one input of the control AND gate 84 in each of the decades. The AND gate 84 in the tens and units decades, however, are disabled at this time because a third input to each of these gates comes from the control flip-flop 76 in the decade of next higher order, and these control flip-flops are in the reset state.

The first clock pulse fully enables the AND gate 84 in the hundreds decade at $t_b$, and the output thereof triggers the flip-flop 12 to increase the binary number in the hundreds decade to 0011. Ladder network 70 now has an output voltage Y of 399 units, which is still less than the unknown voltage. Accordingly, the next clock pulse at $t_c$ again passes through the AND gate 84 in the hundreds decade and triggers the flip-flop 12 back to the reset state. The change in voltage at the (1) output terminal thereof triggers flip-flop 14 to the set state, whereby the hundreds decade stores the binary number 0101, and the ladder network 70 has an output of 599 units. This voltage is greater in magnitude than the unknown voltage X, whereby the signal is removed at the output terminal 26 of the comparator and a signal appears at output terminal 28 at $t_d$, where $t_d - t_c$ is the delay inherent at the counter, network 70 and comparator 24, and is chosen for illustrative purposes only as being one-quarter of a full clock period. Actually, maximum speed of opertaion is achieved when the clock rate is chosen so that the total circuit delay equals one-half a clock period.

The signal at terminal 28 primes one input of AND gate 50 (FIGURE 3). A second input to this gate is primed by the delayed output of the control AND gate 84 at a time $t_e$, assuming that the delay device 46 provides a delay of one-half a clock period. The output of AND gate 50 resets flip-flop 10 and sets the flip-flop 76. The (1) output of control flip-flop 76 now primes the third input of the control AND gate 84 in the tens decade 66, and the (0) output disables the control AND gate 84 in the hundreds decade, whereby no further clock pulses can be applied to trigger the counter in the hundreds decade.

The digital number register in hte hundreds decade now stores the binary number 0100 and the output of the ladder network 70 has a magnitude of 499 units, which is less than the unknown voltage X. Accordingly, a signal reappears at the output terminal 26 of the comparator at $t_f$ and is applied as one input to the AND gate 88. The second input to this gate 88 is the delayed output of AND gtae 50 and is present at time $t_g$, assuming a delay of one-half clock period in delay device 86. Accordingly, the output of AND gate 88 sets the flip-flop 10 at $t_g$ whereby the decade stores the binary number 0101. Also at $t_g$, the output of delay device 86 is applied to the reset to 1 line 80 in the tens decade and resets the flip-flop 16 therein. (Flip-flops 12, 14 and 76 were previously reset and flip-flop 10 was set by the initial reset pulse. The tens decade now stores the binary number 0001, and the output of the ladder network 70 is 519 units.

The clock pulse applied at $t_g$ fully enables the control AND gate 84 in the tens decade, but is unable to trigger the flip-flop 12 therein at this time because a signal is present concurrently on the reset to 1 line 80. Both the output of the AND gate 84 and the signal on the reset line 80 in the tens decade pass through OR gate 44 to the delay device 46, where they are delayed for half a clock period until $t_i$. Meanwhile, the output of 519 units from the ladder network 70 at $t_h$ causes a signal to appear at the output terminal 28 of the comparator. This signal is applied to a second input of AND gate 50, whereby AND gate 50 provides an output at $t_i$ to reset the flip-flop 10 and to set the control flip-flop 76 in the tens decade. The (1) output of control flip-flop 76 primes one input of the control AND gate 84 in the units decade, and the (0) output disables the control AND gate 84 in the tens decade.

The binary number 0000 now is stored in the tens decade and the output of the ladder network has a magnitude of 509 units. Since this value is still higher than the unknown input X, the comparator 24 conducts to supply an output on line 28 and the flip-flop 10 cannot again be set by way of AND gate 88. The delayed output of AND gate 50 in the tens decade resets the flip-flop 16 in the units decade at $t_j$. This reset pulse overrides the clock pulse simultaneously applied at the control AND gate 84 in the units decade. The units decade now stores the binary number 0001, and the output of the ladder network 70 has a magnitude of 501 units. This voltage is less than the unknown analogue input X. Accordingly, after a short delay, the output signal disappears at output terminal 28 of the comparator and a signal appears at output terminal 26 (at $t_k$).

The next clock pulse at $t_l$ fully enables the AND gate 84 in the units decade, and the output thereof triggers flip-flop 12 to the set state. A binary number 0011 now is stored in the units decade, and the output of the ladder network 70 has a value of 503 units. The next clock pulse again fully enables AND gate 84 at $t_m$ and triggers the flip-flop 12 to the reset state. Flip-flop 14 is triggered to the set state by the change in voltage at the (1) output terminal of flip-flop 12. Binary number 0101 now is stored in the units decade 64, and the output Y of the ladder network has a magnitude of 505 units. This value is still less than the unknown voltage X, whereby the signal remains at the output terminal 26 of the comparator and enables the next clock pulse to fully enable the AND gate 84 to $t_n$. The output of AND gate 84 triggers the flip-flop 12 to the set state and is also delayed for half a clock period in device 46 and then applied to the AND gate 50.

Network 70 now has an output of 507 units, which is slightly greater than the unknown voltage X. Accordingly, the output signal disappears from the comparator output terminal 26 and appears at output terminal 28 at $t_o$. This output enables one input of AND gate 50, and the second input thereto becomes enabled at $t_p$. The output of gate 50 resets flip-flop 10 and sets control flip-flop 76 to disable the control AND gate 84. Binary number 0110 now is stored in the units decade 64, and the network output Y has a magnitude of 506 units. Since this voltage is less than the known voltage X, a signal reappears at comparator output terminal 26 at $t_q$ and primes one input of AND gate 88. The second input to gate 88 appears at $t_r$ after being delayed in the device 86. The output of gate 88 again sets flip-flop 10, whereby the binary number 0111 is stored in the units decade. Ladder network 70 has an output of 507 units, whereby a signal reappears at comparator output terminal 28 at $t_s$. This signal is ineffective to reset flip-flop 10 because the last clock pulse did not pass through control AND gate 84 and there is, therefore, no input signal applied at the second input of the AND gate 50.

The operation is now terminated automatically. Hundreds decade 68 stores the binary number 0101, tens decade 66 stores the binary number 0000, and units decade 64 stores the binary number 0111. The decimal equivalent of the stored number is 507, which is less than one unit greater than the unknown voltage X. As mentioned previously, the system can be arranged so that the final number stored in the decades is slightly smaller, by less than one unit, than the unknown voltage when the unknown voltage is not an integral number of units. This may be accomplished by supplying an additional input, or bias, to the ladder network 70 to increase the output voltage thereof by one unit, as was discussed previously in connection with the FIGURE 1 embodiment. Alternatively, the additional input applied to the ladder network 70 could have a value corresponding to one-half unit, since the average error on a statistical basis would be one-half unit in the least significant digit.

What is claimed is:

1. The combination comprising:

a digital number register including a plurality of bistable stages each for storing a binary digit of different order significance, each stage having a set state and a reset state;

all of the bistable stages, except the stage of lowest order significance, being connected as a binary up-counter;

a digital-to-analogue converter connected to receive the outputs of all of the register stages;

comparator means responsive to the output of the converter and to an analogue input signal for producing a first output when the analogue input signal is greater in magnitude than the output of the converter and for producing a second output when the converter output has a greater magnitude than the analogue input signal;

control means responsive to said first output for triggering said counter and for setting said bistable stage of lowest order significance; and means responsive to said second output for resetting the bistable stage of lowest order significance.

2. The combination comprising:

a digital number register including a plurality of bistable stages, each of the bistable stages storing a binary digit of different order significance and each having a set state and a reset state;

all of the bistable stages, except the stage of lowest order significance, being connected as a binary upcounter;

a digital-to-analogue converter connected to receive the outputs of the register;

comparator means responsive to the output of the converter and to an analogue input signal for producing a first output when the analogue input signal is greater in magnitude than the output of the converter and for producing a second output when the converter output has a greater magnitude than the analogue input signal;

control means responsive to said first output for triggering the lowest order stage of the counter;

means responsive to said second output for resetting said bistable stage of lowest order significance and for disabling said control means; and means responsive to said first output for setting the bistable stage of lowest order significance.

3. The combination comprising:

a digital number register including a plurality of bistable stages, each of the bistable stages storing a binary digit of different order significance and each having a set state and a reset state;

all of the bistable stages, except the stage of the lowest order significance, being connected as a binary upcounter;

a digital-to-analogue converter connected to receive the outputs of the register;

comparator means responsive to the output of the converter and to an analogue input signal for producing a first output when the analogue input signal is greater in magnitude than the output of the converter and for producing a second output when the converter output has a greater magnitude than the analogue input signal;

control means responsive to said first output for triggering the lowest order stage of the counter;

means responsive to said second output for resetting said bistable stage of lowest order significance and for disabling said control means; and means responsive to a said first output following a said second output for setting the bistable stage of lowest order significance.

4. The combination comprising:

a digital number register including a plurality of bistable stages, each of the bistable stages storing a binary digit of different order significance, and each having a set state and a reset state;

all of the bistable stages, except the stage of lowest order significance, being connected as a binary upcounter;

a digital-to-analogue converter connected to receive the outputs of the register;

comparator means responsive to the output of the converter and to an analogue input signal for producing a first output when the analogue input signal is greater in magnitude than the output of the converter and for producing a second output when the converter output has a greater magnitude than the analogue input signal;

means for initially resetting all of the bistable stages in the counter and for setting said bistable stage of lowest order significance;

first gate means responsive to said first output for triggering the lowest order stage of the counter;

second gate means responsive to a delayed output of said first gate means and to said second output for resetting the bistable stage of lowest order significance and for disabling said first gate means; and third gate means responsive to a delayed output of said second gate means and to said first output for setting said bistable stage of lowest order significance.

5. The combination comprising:

a digital number register including a plurality of bistable stages, each of the bistable stages storing a binary digit of different order significance, and each having a set state and a reset state;

all of the bistable stages, except the stage of lowest order significance, being connected as a binary upcounter;

a digital-to-analogue converter connected to receive the outputs of the register;

comparator means responsive to the output of the converter and to an analogue input signal for producing a first output when the analogue input signal is greater in magnitude than the output of the converter and for producing a second output when the converter output has a greater magnitude than the analogue input signal;

means for initially resetting all of the bistable stages in the counter and for setting said bistable stage of lowest order significance;

first gate means connected to trigger the lowest order stage of the counter;

means for applying clock pulses and said first output of the comparator means to said first gate means;

second gate means responsive to a delayed output of said first gate means and to said second output for resetting the bistable stage of lowest order significance and for disabling said first gate means; and third gate means responsive to a delayed output of said second gate means and to said first output for setting said bistable stage of lowest order significance.

6. The combination comprising:

a digital number register including a plurality of bistable stages, each of the bistable stages storing a binary digit of different order significance, and each having a set state and a reset state;

all of the bistable stages, except the stage of lowest order significance, being connected as a binary upcounter;

a digital-to-analogue converter connected to receive the outputs of the register;

comparator means responsive to the output of the converter and to an analogue input signal for producing a first output when the analogue input signal is greater in magnitude than the output of the converter and for producing a second output when the converter output has a greater magnitude than the analogue input signal;

means for initially resetting all of the bistable stages in the counter and for setting said bistable stage of lowest order significance;

first gate means connected to trigger the lowest order stage of the counter;

means for applying clock pulses and said first output of the comparator means to said first gate means;

second gate means responsive to a delayed output of said first gate means and to said second output for resetting the bistable stage of lowest order significance and for disabling said first gate means; and third gate means responsive to said first output of said comparator means following a said second output for setting said bistable stage of lowest order significance.

7. The combination comprising:

a digital number register including a plurality of bistable stages each having a set state and a reset state in which the stage stores a binary 1 and a binary 0, respectively, each of the bistable stages storing a binary digit of different order significance;

all of the bistable stages, except the stage of lowest order significance, being connected as a binary up-counter;

a digital-to-analogue converter connected to receive the outputs of the register;

means biasing said converter to cause the output thereof to be within the range of zero to one unit higher than the analogue of the number in the register;

comparator means responsive to the output of the converter and to an analogue input signal for producing a first output when the analogue input signal is greater in magnitude than the output of the converter and for producing a second output when the converter output has a greater magnitude than the analogue input signal;

means for resetting all of the stages of the counter and for setting the bistable stage of lowest order significance;

first control means responsive to the first output of the comparator means for triggering the counter stage of lowest order;

second control means responsive to the second output of said comparator means for resetting said bistable stage of lowest order significance and for disabling said first control means; and means responsive to said first output for setting said bistable stage of lowest order significance.

8. The combination comprising:

a digital number register including a plurality of bistable stages each having a set state and a reset state in which the stage stores a binary 1 and a binary 0, respectively, each of the bistable stages storing a binary digit of different order significance;

all of the bistable stages, except the stage of lowest order significance, being connected as a binary up-counter;

a digital-to-analogue converter connected to receive the outputs of the register;

means biasing said converter to cause the output thereof to be within the range of zero to one unit higher than the analogue of the number in the register;

comparator means responsive to the output of the converter and to an analogue input signal for producing a first output when the analogue input signal is greater in magnitude than the output of the converter and for producing a second output when the converter output has a greater magnitude than the analogue input signal;

means for resetting all of the stages of the counter and for setting the bistable stage of lowest order significance;

first gate means connected to trigger the counter stage of lowest order;

means for applying clock pulses and the first output of said comparator means to said first gate means;

control means responsive to the second output of the comparator and to a signal from either one of the resetting means and the first gate means for resetting said bistable stage of lowest order significance and for disabling said first gate means; and means responsive to a said first output of said comparator means, following a said second output, for setting said bistable stage of lowest order significance.

9. The combination comprising:

a digital number register including a plurality of bistable storage stages each having a set state and a reset state, each of the storage stages storing a binary digit of different order significance;

all of the bistable storage stages, except the stage of lowest order significance, being connected as a binary upcounter;

a digital-to-analogue converter connected to receive the outputs of all of the storage stages in the register;

comparator means responsive to the output of the converter and to an analogue input signal for producing a first output when the analogue input signal is greater in magnitude than the output of the converter, and for producing a second output when the converter output has greater magnitude than the analogue input signal;

a bistable control stage;

means for resetting all of the stages of the counter and the bistable control stage and for resetting the bistable storage stage of lowest order significance;

first control means for triggering the counter stage of lowest order;

means for applying clock pulses, the first output of the comparator means and an output of the bistable control stage as inputs to the first control means;

means responsive to the second output of the comparator means for resetting the bistable storage stage of lowest order significance and for setting the bistable control stage to disable the first control means; and gate means responsive to a said first output of the comparator means for setting the bistable storage stage of lowest order significance.

10. An analogue-to-binary coded decimal converter comprising:

a plurality of number storage and control units, each for a binary coded decimal number of different order significance, each unit including: four bistable storage stages and a bistable control device, each of the storage stages storing a binary digit of different order significance in the particular number; means connecting all of the bistable storage stages of a unit, except the stage of lowest order significance, as a binary up-counter; first control means connected to trigger the lowest order stage in the counter; means connecting one output of the bistable control device to one input of the first control means; second control means connected to reset the bistable storage stage of lowest order significance and to set the bistable control device; and means for delaying the output of the first control means and applying it as one input to the second control means;

means applying a second output of the bistable control device of each unit to an input of the first control means in the unit of next lower order significance;

means for applying clock pulses to the first control means in each of the units;

means for resetting the bistable control devices in all units, setting the bistable storage stage of lowest order significance in each of the units, setting the bistable stage of highest order significance in each of the units except the unit of highest order significance, and for resetting all of the remaining bistable storage stages;

a digital-to-analogue converter connected to receive the outputs of all of the bistable storage stages in all of the units;

comparator means responsive to the output of the converter and to an analogue input signal for producing a first output when the analogue input signal is greater in magnitude than the output of the converter and for producing a second output when the converter output has a greater magnitude than the analogue input signal;

means connecting said first comparator means output to one input of each of the first control means;

means for applying said second output to the second control means in each of the units; and means responsive to an output from the second control means in a unit for resetting the highest order storage stage in the unit of next lower order significance.

References Cited by the Examiner

UNITED STATES PATENTS

| | | | |
|---|---|---|---|
| 2,845,597 | 7/1958 | Perkins | 324—103 |
| 2,970,309 | 1/1961 | Towles | 340—347 |
| 2,997,704 | 8/1961 | Gordon | 340—347 |
| 3,178,701 | 4/1965 | Woolam | 340—347 |

MAYNARD R. WILBUR, *Primary Examiner.*

JAMES WALLACE, *Assistant Examiner.*